H. W. TAYLOR AND F. H. CLOUGH.
WINDING FOR DYNAMO ELECTRIC MACHINES.
APPLICATION FILED DEC. 9, 1920.
1,390,063.
Patented Sept. 6, 1921.
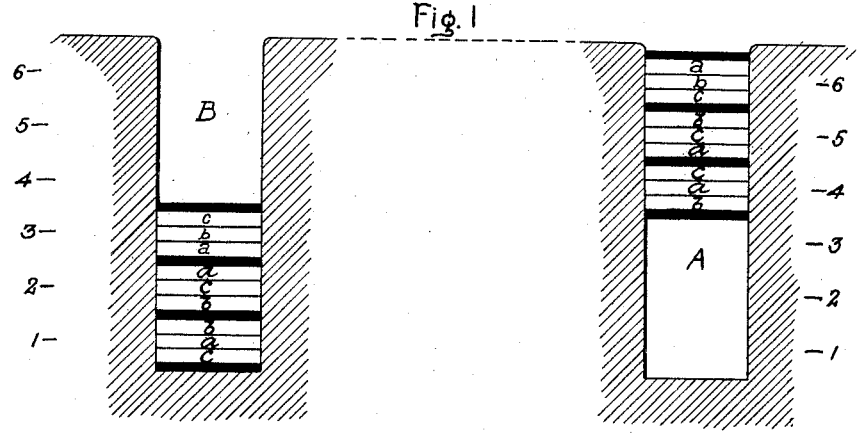
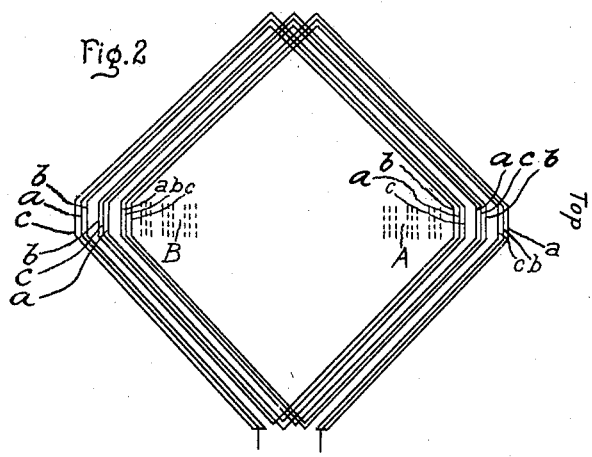
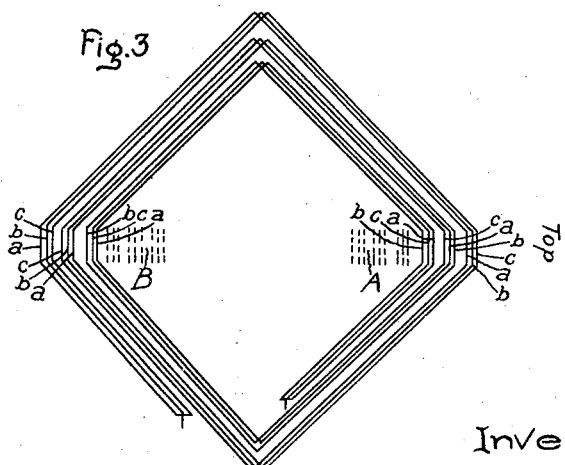
Inventors:
Henry W. Taylor,
Frederick H. Clough,
by Albert G. Davis
Their Attorney.

UNITED STATES PATENT OFFICE.

HENRY WILLIAM TAYLOR, OF BILTON, AND FREDERICK HORTON CLOUGH, OF RUGBY, ENGLAND, ASSIGNORS TO GENERAL ELECTRIC COMPANY, A CORPORATION OF NEW YORK.

WINDING FOR DYNAMO-ELECTRIC MACHINES.

1,390,063.        Specification of Letters Patent.      Patented Sept. 6, 1921.

Application filed December 9, 1920. Serial No. 429,499.

*To all whom it may concern:*

Be it known that we, HENRY WILLIAM TAYLOR and FREDERICK HORTON CLOUGH, subjects of the King of Great Britain, residing, respectively, at Bilton, county of Warwickshire, England, and at Rugby, county of Warwickshire, England, have invented certain new and useful Improvements in Windings for Dynamo-Electric Machines, (for which I have filed an application in England, December 2, 1919, No. 30,062,) of which the following is a specification.

The present invention relates to dynamo-electric machines and more particularly to armature windings for alternating current machines.

In large alternating current generators in which the windings disposed in the armature slots consist of conductors of considerable depth, magnetic flux across the slot resulting from the current in the conductors gives rise to a parasitic voltage within the conductors which is liable to cause local currents and thereby produce heating of the conductors and an inefficient use of the copper in the armature.

The magnetic flux which exists at any instant within the body of a conducting unit such as a lamination or a group of laminations placed in the bottom of the slot depends only upon the current being carried in this unit, and therefore, gradually increases from zero at the bottom of the unit. The flux in any other unit near the mouth of the slot depends not only upon the current which that unit is carrying but also upon the current in the units below the one in question. The flux across such a unit may therefore be considered as consisting of a variable element due to the current in the unit and also of a number of constant elements which depend upon the number of units below the unit in question, as, for example, the second unit is subjected to the influence of one constant element of flux, the third unit is subjected to the influence of two constant elements of flux, the fourth unit to three constant elements of flux, etc. By the term constant I mean that the flux due to the current in the units below is uniformly distributed throughout the unit in question. A variable element of flux, however, is not uniformly distributed, but as above stated, increases in density from the bottom of the unit. It is to be noted that from time to time as the current changes the value of both the constant and variable elements also changes. At the time of maximum current the total quantity of flux existing in any unit, that is, the sum of the constant and variable elements is a maximum and this is the flux which upon the rise of current has cut the bottom of the conducting unit but not the top of the unit. Regardless of the total quantity of flux which is moved upward through the unit it is this flux only which causes the voltage to be set up tending to cause the parasitic current to flow between the top and bottom of the unit.

It has hitherto been proposed to limit the current which will flow as a result of these parasitic voltages first, by dividing the conductor into a number of separate multiple bars or sections and secondly, by continuing these laminations of the complete conductor throughout an entire coil and so connecting the ends that the order of sections in the conductors in the upper portion of the coil is the reverse of the order of the sections in the lower portion of the coil. It is found, however, that with large conductors the local currents which flow even when these provisions are made are still excessive and impose limitations upon the design of the machine.

Our present invention seeks to limit still further the parasitic currents by a special construction and arrangement of the conducting units which make up the winding as will be hereafter more fully described.

In the accompanying drawing, Figure 1 illustrates diagrammatically two armature slots which are adapted to receive a winding of three turns per phase, the conductors forming the winding being each composed of three sections; Fig. 2 is a full development of the winding illustrated in Fig. 1; Fig. 3 is the development of a modified form of winding.

Referring to Figs. 1 and 2, A and B represent in vertical section two slots distant from each other by approximately one pole pitch. The winding developed in Fig. 2 is formed of a conductor consisting of sections, *a*, *b* and *c*. These sections are numerically equal to the number of turns of the winding and are insulated from each other throughout their lengths. It will be noted that the conductor passes from position 6 in slot A to position 3 in slot B, back to position 5 in slot A, to position 2 in slot B, position 4 in slot A, to position 1 in slot B. The conductor throughout the winding therefore occupied all positions within a slot.

Considering the sections of which the conductor is formed, it will be noted that in passing from position 6 in slot A to position 3 in slot B the order of the sections within the conductor is reversed and in passing to position 5 in slot A the order of the sections is changed from $a, b, c$ (the order in position 3 of slot B) to $a, c, b$, and in passing to position 2 in slot B the order is again reversed from that in the previous slot. In position 4 of slot A the order becomes $b, a, c$, and finally in position 1 of slot B the order is referred to $c, a, b$. Comparing the orders of the sections in slot A, it will be noted that each section from turn to turn occupies successive positions within the conductor. The same is true of the sections in slot B except that in each turn the order is the reverse in slot B from the order in slot A.

The above arrangement results in a winding wherein the net constant flux elements are the same for each turn. These elements linking the section in positions 1, 2, 3, 4, 5 and 6 are 0, 1, 2, 3, 4 and 5 respectively so that the net constant elements of flux linking the first turn is 5—2=3 (one half turn being the reverse of the other half turn); similarly the net constant elements of flux linking the second turn is 4—1=3 and for the third turn is 3—0=3. With this arrangement in a normal type of winding the parasitic currents circulating between laminations are in effect eliminated.

The arrangement shown in Fig. 3 is similar to that shown in Figs. 1 and 2 in that the laminations from turn to turn occupy successive positions but differs from the former arrangement in that the winding proceeds from position 4 in slot A to position 3 of slot B, back to the next higher position in slot A, then to the next lower position in slot B, continuing to progress in this manner away from the centers of these slots. This arrangement also differs from the former ones in that the order of laminations is not reversed in passing from slot A to slot B. The net constant elements of flux in the first turn are 5+0=5, in the second turn 4+1=5, and the third, 3+2=5.

What we claim as new and desire to secure by Letters Patent of the United States, is,—

1. An armature provided with slots and a winding occupying two of said slots and formed of a conductor composed of a plurality of sections, said sections being insulated from each other throughout the winding and occupying through adjacent turns successive positions within the conductor, the sum of the constant flux elements linking the conductor being the same for each turn of the winding.

2. A winding adapted to occupy two slots of an armature formed of a conductor divided into sections corresponding to the number of turns of the winding, said sections occupying different relative positions in adjacent turns and so arranged within the slots that the sum of the constant flux elements linking the sections is the same for each turn of the winding.

3. A winding adapted to occupy two slots of an armature formed of a conductor divided into sections corresponding to the number of turns of the winding, said sections occupying the same relative position in the two halves of each turn and different relative positions in adjacent turns and adapted to be so arranged within the slots that the sum of the constant flux elements linking the sections is the same for each turn of the winding.

In witness whereof, we have hereunto set our hands this seventeenth day of November, 1920.

HENRY WILLIAM TAYLOR.
FREDERICK HORTON CLOUGH.

Witnesses to the signature of Henry William Taylor:
M. E. TAYLOR,
V. M. SHARLAND.

Witnesses to the signature of Frederick Horton Clough:
J. A. FOSTER,
D. WHITE.